(12) United States Patent
Park

(10) Patent No.: US 7,980,368 B2
(45) Date of Patent: Jul. 19, 2011

(54) DAMPING FORCE VARIABLE SHOCK ABSORBER

(75) Inventor: Kyu Shik Park, Seoul (KR)

(73) Assignee: Mando Corporation, Seoul (KR)

( * ) Notice: Subject to any disclaimer, the term of this patent is extended or adjusted under 35 U.S.C. 154(b) by 264 days.

(21) Appl. No.: 12/023,430

(22) Filed: Jan. 31, 2008

(65) Prior Publication Data
US 2008/0185245 A1    Aug. 7, 2008

(30) Foreign Application Priority Data
Feb. 2, 2007   (KR) .................... 10-2007-0010978

(51) Int. Cl.
*F16F 9/34*    (2006.01)
*F16F 9/50*    (2006.01)

(52) U.S. Cl. ................. 188/322.15; 188/282.5; 188/316
(58) Field of Classification Search ............ 188/322.13, 188/322.15, 322.18, 316–317, 282.5, 282.8, 188/283
See application file for complete search history.

(56) References Cited

U.S. PATENT DOCUMENTS

| | | | | |
|---|---|---|---|---|
| 4,512,447 A | | 4/1985 | Miura ...................... 188/322.15 |
| 4,972,929 A | * | 11/1990 | Ivers et al. ............... 188/322.15 |
| 5,529,154 A | * | 6/1996 | Tanaka ....................... 188/282.6 |
| 5,975,258 A | * | 11/1999 | Nezu et al. ................ 188/322.15 |
| 6,155,391 A | | 12/2000 | Kashiwagi et al. ......... 188/266.6 |
| 6,672,436 B1 | * | 1/2004 | Keil et al. ................. 188/322.14 |
| 7,584,829 B2 | * | 9/2009 | Schmidt .................... 188/322.15 |
| 2005/0263363 A1 | | 12/2005 | Katou et al. ............. 188/322.22 |
| 2006/0225976 A1 | * | 10/2006 | Nakadate ...................... 188/266 |

FOREIGN PATENT DOCUMENTS

| | | |
|---|---|---|
| JP | 10073141 | 3/1998 |
| JP | 10141416 | 5/1998 |
| JP | 10184761 | 7/1998 |
| JP | 2001041272 A | 2/2001 |
| KR | 100284882 | 12/2000 |
| KR | 10-2006-0128226 A | 12/2006 |

* cited by examiner

*Primary Examiner* — Melody M Burch
(74) *Attorney, Agent, or Firm* — McDermott Will & Emery LLP

(57) ABSTRACT

A damping force variable shock absorber is provided, which is configured to prevent a ring disc of a damping force variable valve from being excessively bent without increasing the thickness of the ring disc. The damping force variable shock absorber includes a damping force variable valve controlled in a pilot control manner by operating a solenoid. The damping force variable valve includes a disc valve and a pilot chamber provided in a housing to vary damping force. The disc valve includes a main disc, a pilot disc-S provided adjacent to the main disc in the rear thereof, and a ring disc having an outer periphery supported on a supporting portion of the housing. A spacer disc is inserted between the main disc and the pilot disc-S, the spacer disc having an outer diameter smaller than an outer diameter of an arc-shaped slot of the ring disc.

4 Claims, 7 Drawing Sheets

DAMPING FORCE VARIABLE SHOCK ABSORBER

BACKGROUND

1. Technical Field

The present invention relates to a damping force variable shock absorber, and more particularly, to a damping force variable shock absorber, in which a damping force is adjusted using a damping force variable valve controlled in a pilot control manner in a vehicle.

2. Description of the Related Art

In general, a shock absorber is mounted to a vehicle such as an automobile to absorb and relieve vibration or shock transmitted from wheels being in contact with a road in driving.

In order to enhance ride comfort or handling stability of a vehicle, it is preferable that the damping force of such a shock absorber be properly adjusted according to a road condition, a vehicle driving state and the like. For example, the damping force of the shock absorber is preferably reduced when the vehicle is normally driven so that the vibration caused by irregularities of a road is sufficiently absorbed to enhance comfortable ride. On the other hand, the damping force of the shock absorber is preferably increased when the vehicle is turned, accelerates, brakes or is driven at a high speed so as to restrain a posture change of a vehicle body and to improve handling stability.

To this end, a damping force variable shock absorber, in which the damping force is varied to be properly adjusted using a damping force variable valve controlled in a pilot control manner, has been developed.

In a rebound stroke of the damping force variable shock absorber, oil in an upper room above a piston within a cylinder passes through the damping force variable valve and then is introduced into a reservoir chamber. At this time, the damping force is generated due to the resistance caused when the oil passes through the damping force variable valve. In a compression stroke of the above damping force variable shock absorber, oil in a lower room below a piston within a cylinder passes through a check valve of the piston and the damping force variable valve and then is introduced into the reservoir chamber. As in the rebound stroke, the damping force is generated due to the resistance caused when the oil passes through the damping force variable valve.

In general, most of a damping force variable valve of a damping force variable shock absorber controls damping force in a pilot control manner in which a pressure-flow rate characteristic is controlled by operating a solenoid, and is configured such that the damping force generated in the rebound stroke and the damping force generated in the compression stroke are simultaneously increased or reduced according to a solenoid current. For example, in the damping force variable valve controlled in the pilot control manner by operating a solenoid, the damping force generated in the rebound stroke and the damping force generated in the compression stroke are controlled to be in a soft or hard mode by controlling a solenoid current. A spool moving according to the operation of the solenoid generates and controls back-pressure in a pilot chamber formed in the rear of a main disc for varying damping force, so that the control of the damping force as described above is achieved.

Such a conventional damping force variable valve controlled in a pilot control manner will be described in detail with reference to FIGS. 1 to 4.

As illustrated in FIG. 1, a conventional damping force variable valve 1 is provided at the outside of the shock absorber, surrounded by a cylindrical housing 110 having an axial side coupled with an outer peripheral surface of the shock absorber, and includes a disc valve 120 and a pilot chamber 130 provided in the housing 110 to vary the damping force of the shock absorber. The pilot chamber 130 is provided in the rear of the disc valve 120 to have back-pressure against the disc valve 120.

In addition, a high-pressure chamber 101a communicating with an upper room above or lower room below the piston of the shock absorber and a low-pressure chamber 101b communicating with a reservoir chamber of the shock absorber are provided in a housing 110.

The disc valve 120 is provided in the rear of a retainer 122 so that a communication passage 122a formed in the retainer 122 in an axial direction of the housing 110 is covered with the disc valve 120. In the meantime, the retainer 122 communicates with the high-pressure chamber 101a via a connector 121. Accordingly, high-pressure fluid introduced from the high-pressure chamber 101a via the connector 121 passes through the communication passage 122a and then flows toward the disc valve 120.

In addition, the disc valve 120 resists the fluid flowing in the communication passage 122a. In such a process, the disc valve 120 is bent backward to make the fluid return to the low-pressure chamber 101b.

As illustrated in FIG. 2, the disc valve 120 comprises a plurality of discs for resisting the fluid and generating the damping force through the resistance, i.e., a main disc 120a, a pilot disc-S 120b provided adjacent to the main disc 120a in the rear thereof, a ring disc 120c provided adjacent to the pilot disc-S 120b in the rear thereof, and a plurality of sub-discs 120d provided adjacent to the ring disc 120c in the rear thereof. A slit Sa is formed in an inner periphery of the main disc 120a, a slit Sb is formed in an outer periphery of the pilot disc-S 120b, and an arc-shaped slot Sc is formed in the ring disc 120c between its inner and outer peripheries to communicate with the slit Sb of the pilot disc-S 120b. In addition, a slit Sd is formed in an outer periphery of the foremost one of the plurality of sub discs 120d which is in contact with the ring disc 120c to communicate with the slot Sc of the ring disc 120c. The aforementioned slits and slot function as a fixed orifice.

In addition, the retainer 122 is formed with a bypass passage 122b, which passes through the retainer 122 in a general radial direction of the housing 110 and communicates with the low-pressure chamber 101b.

Further, the pilot chamber 130 is configured such that the pressure in the pilot chamber is varied according to the operation of a solenoid driving unit 140, so that a predetermined back-pressure is generated in the rear of the disc valve 120 against the disc valve 120. A change of pressure in the pilot chamber 130, i.e., a change of back-pressure against the disc valve 120 causes the disc valve 120 to vary the resistance against the fluid passing through the slit Sa of the main disc 120a, so that it is possible to provide a varied damping force to the shock absorber.

As illustrated in FIG. 3, the solenoid driving unit 140 comprises a push rod 142 moving frontward or rearward depending on a current value of a solenoid 141. For example, the push rod 142 moves to a location, at which the soft damping force is generated, when a relatively low current (e.g., 0.3 A) is applied, and the push rod moves to a location, at which the hard damping force is generated, when a relatively high current (e.g., 1.3 A) is applied.

The damping force variable valve 1 comprises a spool 150, which is disposed coaxially with the push rod 142 and is translated in cooperation with the push rod 142. The spool 150, which moves along a spool guide 160, has one end in contact with the push rod 142 and the other end elastically supported by a compression spring 155. Accordingly, the spool 150 moves forward by being pushed by the push rod 142 and retreats by restoring force of the compression spring 155.

A first guide groove 151a and a second guide groove 151b are formed on an outer peripheral surface of the spool 150. The spool guide 160 is formed with a first connection port 161a connected to the bypass passage 122b, a second connection port 161b connected to a portion between the rear of the retainer 122 and the front of the disc valve 120, and a third connection port 161c connected to the pilot chamber 130.

The movement of the spool 150 caused by the operation of the solenoid, furthermore, the interaction between the spool 150 and the spool guide 160 causes the opening and closing and/or an opening ratio of a back-pressure adjusting flow passage, which extends from an upstream of the disc valve 120 to the pilot chamber 130, to be controlled. That is, the extent to which the first guide groove 151a and the first connection port 161a are connected and the extent to which the second guide groove 151b and the second connection port 161b are connected, are controlled thereby functioning as variable orifices. A connecting portion between the first guide groove 151a and the first connection port 161a is referred to as a first variable orifice and a connecting portion between the second guide groove 151b and the second connection port 161b is referred to as a second variable orifice.

In a soft mode, the spool 150 moves by controlling a solenoid current, so that the first variable orifice becomes an opened state and the second variable orifice becomes a closed state as shown in FIGS. 1 and 2. In this case, the oil passing through the first variable orifice is bypassed through the bypass passage 122b to the low-pressure chamber 101b. The pilot chamber 130 has a characteristic that is similar to the pressure of the low-pressure chamber 101b since the second variable orifice that is an inlet flow passage of the pilot chamber 130 is closed. As described above, when the pressure in the pilot chamber 130 is low, the pressure of the high-pressure chamber 101a makes it possible for the disc valve 120 to be opened at a low pressure, so that a soft pressure-flow rate characteristic and a soft damping force characteristic are obtained.

In a hard mode, a location of the spool 150 is changed by controlling the solenoid current, so that the first variable orifice becomes a closed state and the second variable orifice becomes an opened state as shown in FIGS. 3 and 4. In this case, the pressure in the pilot chamber 130 is increased as the second variable orifice that is an inlet flow passage of the pilot chamber 130 is opened. Accordingly, the opening pressure of the disc valve 120 is increased, so that a hard pressure-flow rate characteristic and a hard damping force characteristic are obtained.

In the meantime, as shown in detail in FIG. 4, since an outer periphery of a front surface of the ring disc 120c of the disc valve 120 is supported on a supporting portion 111 of the housing 110, an excessive bending phenomenon is generated on the ring disc 120c if the pressure in the pilot chamber 130 is increased in order to increase the damping force in the hard mode. In this case, a point, on which the load transmitted from the ring disc 120c to the main disc 120 is exerted, is shifted outwards on the ring disc 120c as the ring disc 120c is bent. Accordingly, there is a problem in that as an effective operating area of the pilot chamber 130 is increased and thus a flow rate is increased, a larger force is transmitted from the pilot chamber 130 to the main disc 120a to thereby generate excessive pressure and damping force. In order to prevent the above problem, the thickness of the ring disc 120c may be increased. However, such an approach causes the stiffness of the main disc 120a to be increased, which causes the damping force to be necessarily increased in the soft mode.

BRIEF SUMMARY

An object of the present invention is to provide a damping force variable shock absorber, which is configured to prevent a ring disc of a damping force variable valve from being excessively bent without increasing the thickness of the ring disc.

According to an aspect of the present invention for achieving the objects, there is provided a damping force variable shock absorber includes a damping force variable valve controlled in a pilot control manner by operating a solenoid. The damping force variable valve comprises a disc valve and a pilot chamber provided in a housing to vary damping force. The disc valve comprises a main disc, a pilot disc-S provided adjacent to the main disc in the rear thereof, and a ring disc having an outer periphery supported on a supporting portion of the housing. A spacer disc is inserted between the main disc and the pilot disc-S, the spacer disc having an outer diameter smaller than an outer diameter of an arc-shaped slot of the ring disc.

DETAILED DESCRIPTION

Figure 1:
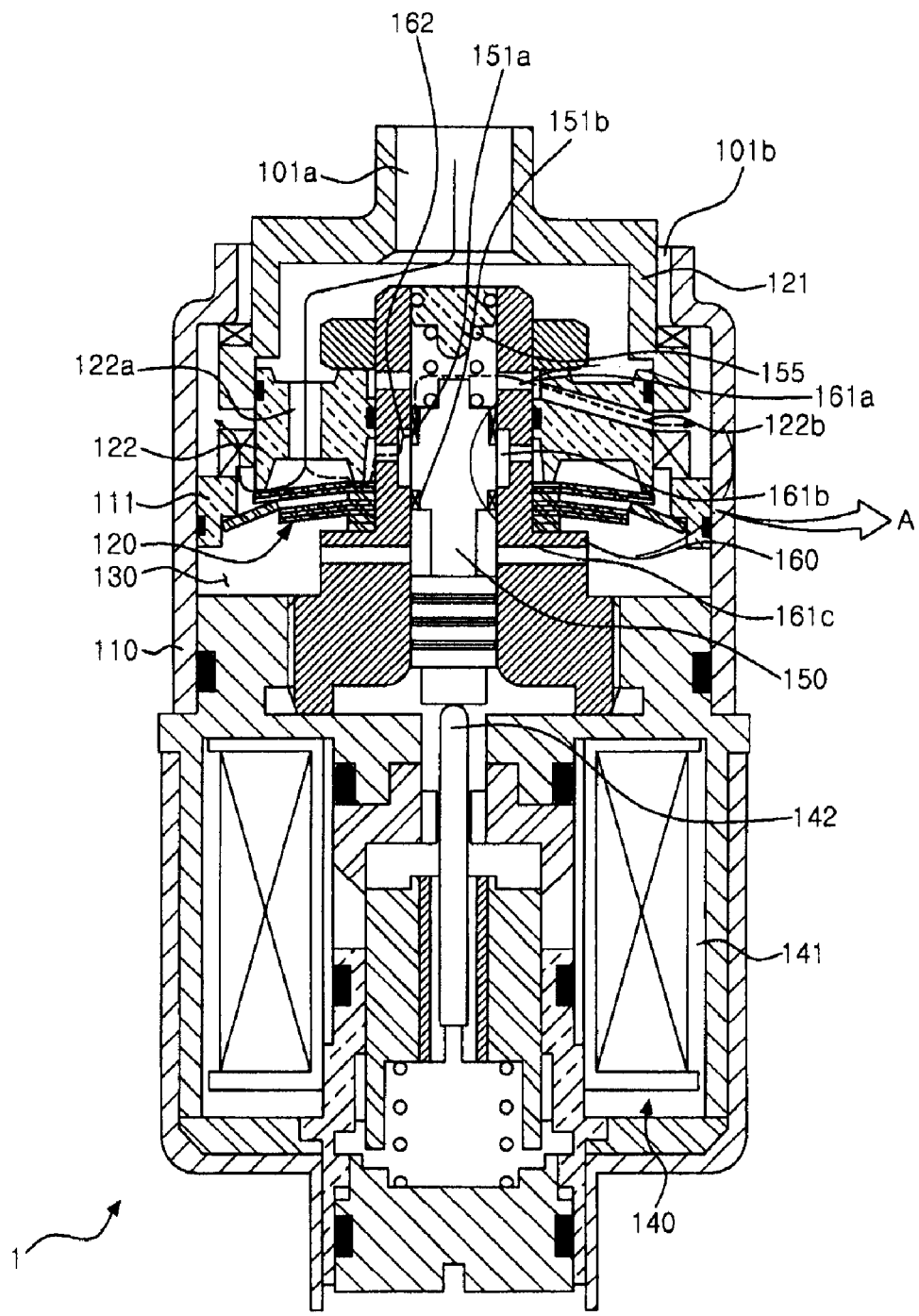
FIG. 1 is a sectional view of a damping force variable valve of a conventional damping force variable shock absorber in a soft mode.
Figure 2:
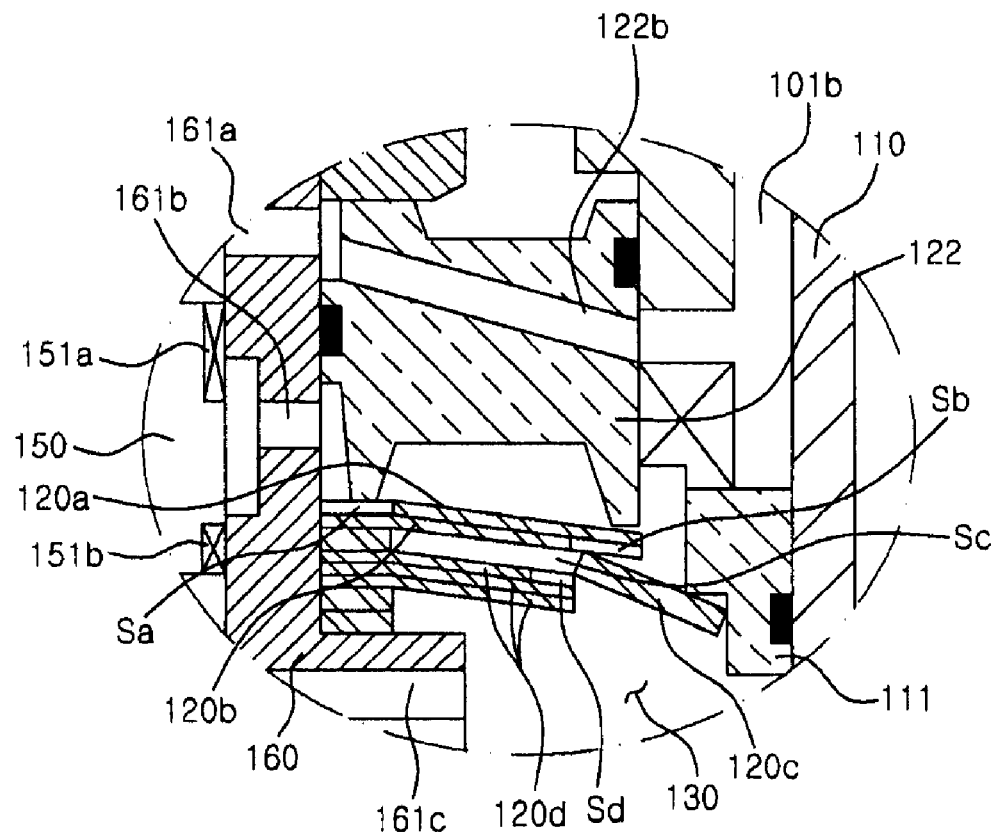
FIG. 2 is an enlarged view of a portion A in FIG. 1.
Figure 3:
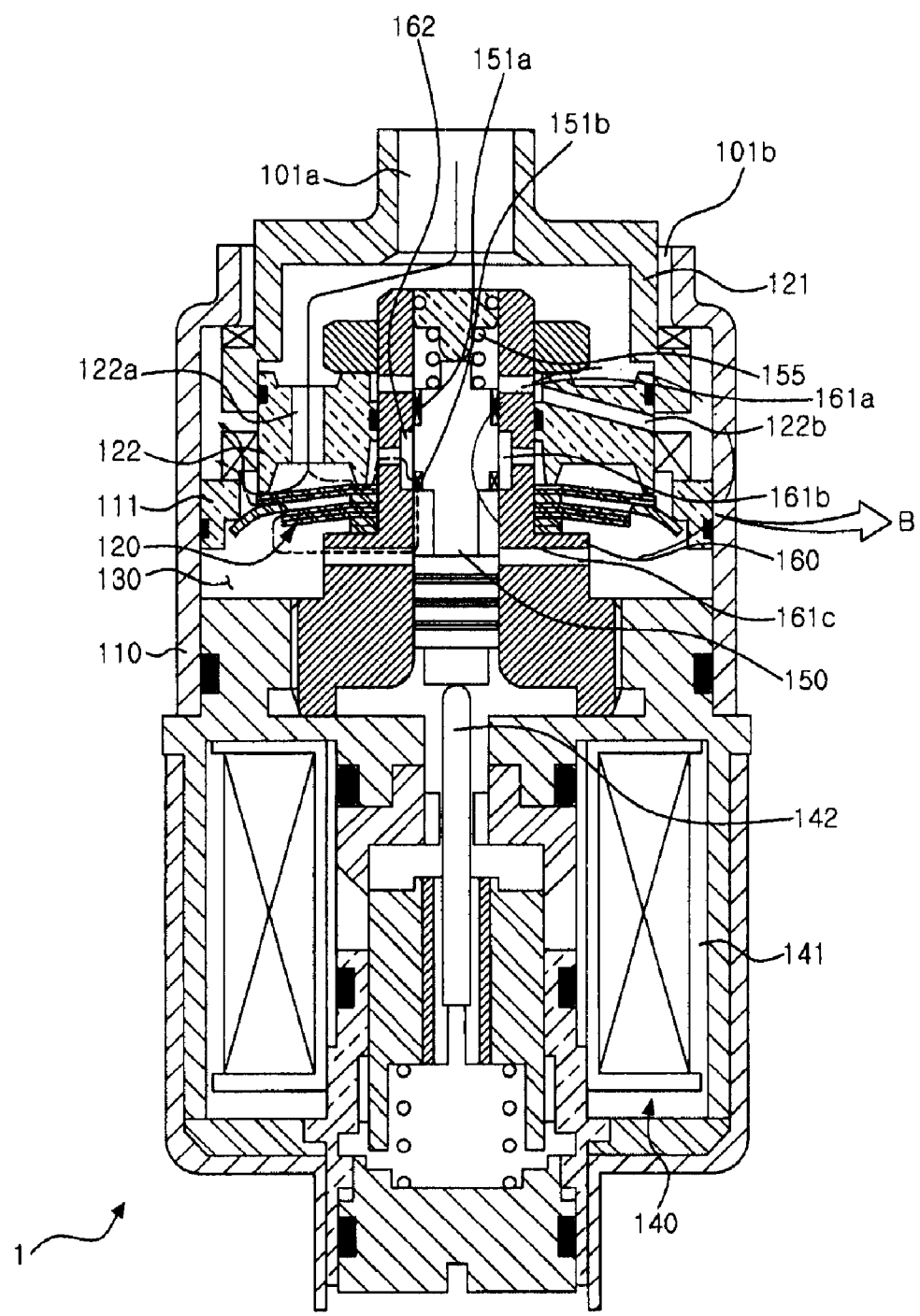
FIG. 3 is a sectional view of the damping force variable valve of the conventional damping force variable shock absorber in a hard mode.
Figure 4:
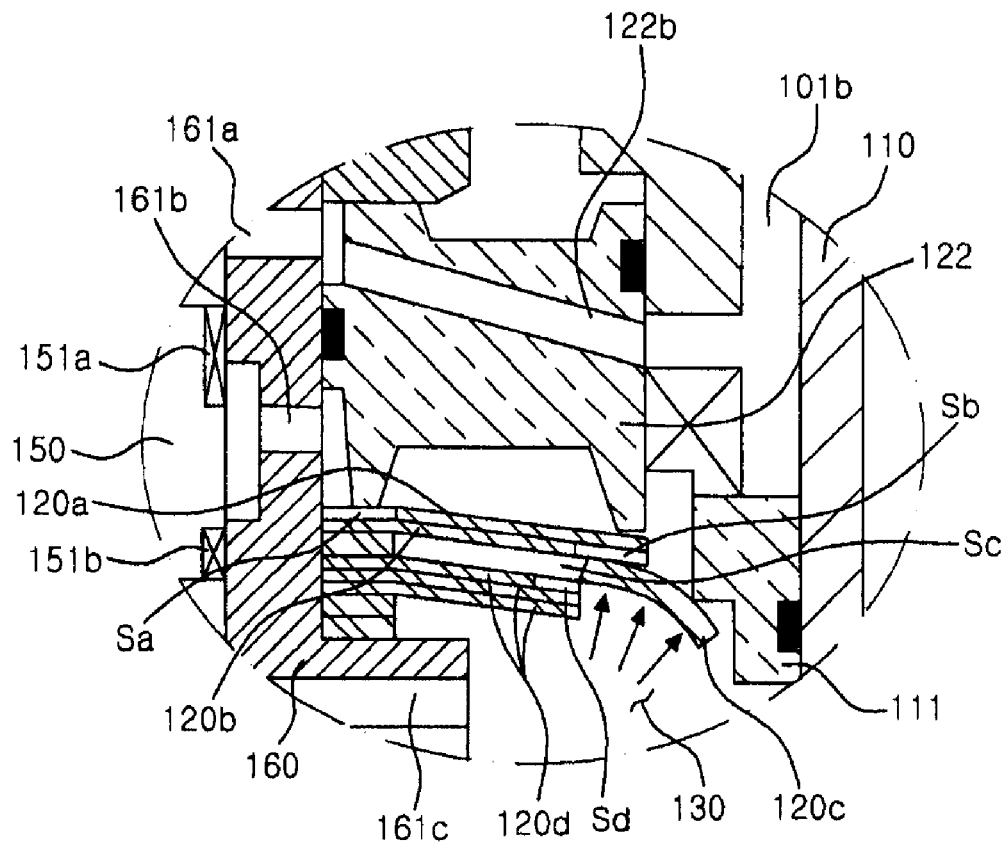
FIG. 4 is an enlarged view of a portion B in FIG. 3.

Hereinafter, a preferred embodiment of the present invention will be described with reference to the accompanying drawings. In this embodiment, the same element of the present invention as that of the prior art is designated by the same reference numeral.

Figure 5:
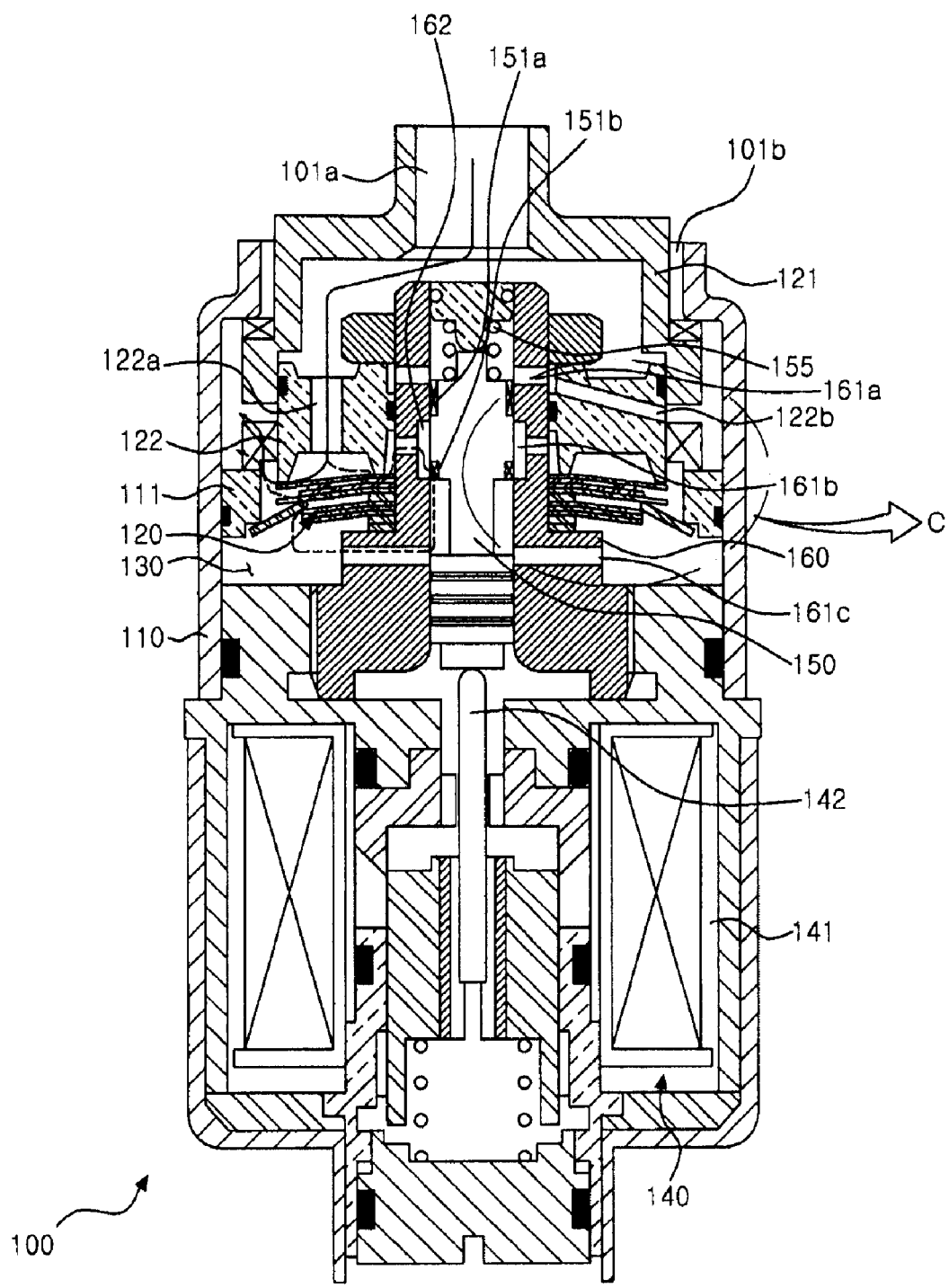
FIG. 5 is a sectional view of a damping force variable valve of a damping force variable shock absorber according to an embodiment of the present invention in a hard mode.

FIG. 5 is a longitudinal sectional view of a damping force variable valve of a damping force variable shock absorber according to an embodiment of the present invention. As shown in FIG. 5, the damping force variable shock absorber according to this embodiment comprises a damping force variable valve 100 controlled in a pilot control manner by operating a solenoid.

Figure 6:
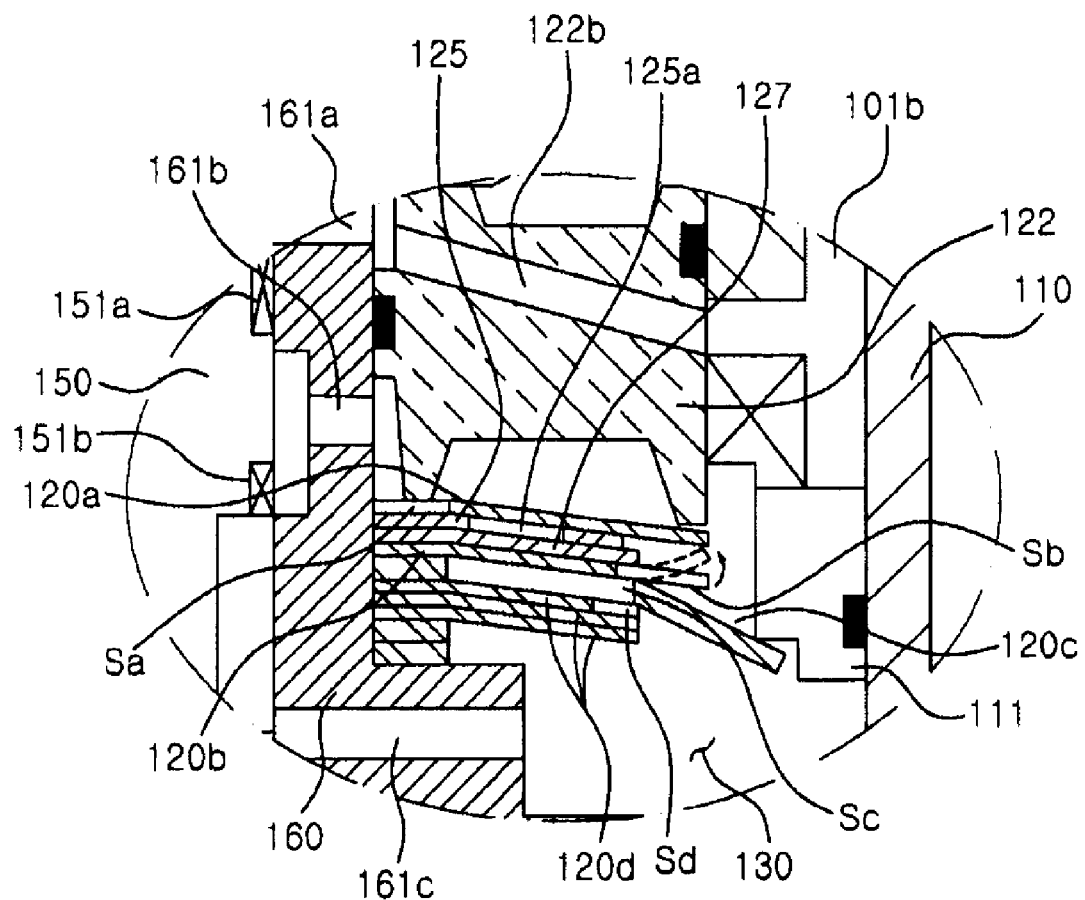
FIG. 6 is an enlarged view of a portion C in FIG. 5.

The damping force variable valve 100 of the present invention comprises a disc valve 120 and a pilot chamber 130 provided in a housing 110 to vary a damping force. Also, as illustrated in FIG. 6, the disc valve 120 comprises a main disc 120a, a pilot disc-S 120b adjacent to the main disc 120a in the rear thereof, a ring disc 120c provided adjacent to the pilot disc-S 120b in the rear thereof and having an outer periphery supported on a supporting portion 111 of the housing 110, and a plurality of sub-discs 120d provided adjacent to the ring disc 120c in the rear thereof. A slit Sa is formed in an inner periphery of the main disc 120a, a slit Sb is formed in an outer periphery of the pilot disc-S 120b, and an arc-shaped slot Sc is formed in the ring disc 120c between its inner and outer peripheries to communicate with the slit Sb of the pilot disc-S 120b. In addition, a slit Sd is formed in an outer periphery of the foremost one of the plurality of sub discs 120d which is in contact with the ring disc 120c to communicate with the slot Sc of the ring disc 120c. The basic configuration and operation of the damping force variable valve 100 are the same as those of the prior art. Accordingly, in this embodiment, the detail description thereon will be omitted.

As illustrated in detail in FIG. 6, the present invention has the configuration in which a spacer disc 125 is inserted between the main disc 120a and the pilot disc-S 120b in the disc valve 120. Here, the outer diameter of the spacer disc 125 should be smaller than the outer diameter of the arc-shaped slot Sc of the ring disc 120c. As described above, if the spacer disc having the outer diameter smaller than the outer diameter of the arc-shaped slot Sc of the ring disc 120c is installed between the main disc 120a and the pilot disc-S 120b, an outer periphery of the pilot disc-S 120b is spaced apart from the main disc 120a in a state where the slit Sb formed on the outer periphery of the pilot disc-S 120b communicates with the arc-shaped slot Sc of the ring disc 120c. Accordingly, the ring disc 120c is prevented from being excessively bent when the pressure in the pilot chamber 130 is increased in order to increase the damping force in a hard mode. Thus, a point, on which the load transmitted from the ring disc 120c to the main disc 120 is exerted, is not shifted outwards on the ring disc 120c. Accordingly, an effective operating area of the pilot chamber 130 is reduced, and a larger force is not transmitted from the pilot chamber 130 to the main disc 120a even if a flow rate is increased, so that excessive pressure and damping force are not generated to thereby improve a pressure-flow rate characteristic.

Here, if a pilot disc 127 is inserted between the pilot disc-S 120b and the spacer disc 125, it is possible to control an area of a flow passage of the fixed orifice consisting of the slit Sb of the pilot disc-S 120b and the arc-shaped slot Sc of the ring disc 120c.

Figure 7:
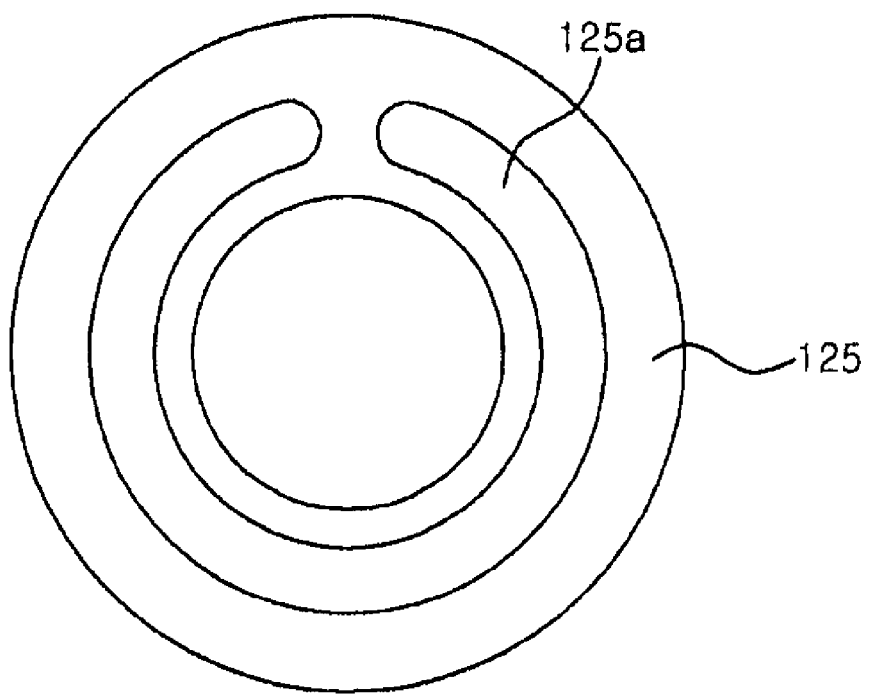
FIG. 7 is a plan view of a spacer disc of the damping force variable valve of the damping force variable shock absorber according to the embodiment of FIG. 5.

In addition, as illustrated in detail in FIG. 7, if an intermediate portion is removed in a radial direction of the spacer disc 125 to form an arc-shaped slot 125a, it is possible to prevent the stiffness of the main valve 120a from being increased.

As illustrated above, according to the damping force variable shock absorber of the present invention, the spacer disc having the outer diameter smaller than the outer diameter of the arc-shaped slot of the ring disc is installed between the main disc and the pilot disc-S. Thus, there is an advantage in that the ring disc can be prevented from being excessively bent without increasing the thickness of the ring disc.

Although an embodiment of the present invention has been described, it will be apparent to those skilled in the art that various modifications, changes and variations can be made thereto within the scope of the present invention and the appended claims. Therefore, the aforementioned descriptions and the accompanying drawings should be construed as not limiting the technical spirit of the present invention but illustrating an embodiment of the present invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A damping force variable shock absorber comprising:
    a damping force variable valve controlled in a pilot control manner by operating a solenoid, the damping force variable valve including:
    a housing;
    a retainer being disposed in the housing, the retainer being formed with a communication passage communicating with a high-pressure chamber and a bypass passage communicating with a low-pressure chamber;
    a disc valve being provided in the rear of retainer, the communication passage being covered with the disc valve; and
    a pilot chamber being provided in the rear of the disc valve to have back-pressure against the disc valve,
    wherein the disc valve comprises:
    a main disc directly covering the communication passage and firstly resisting the fluid flowing through the communication passage,
    a pilot disc-S provided adjacent the main disc in the rear thereof to cooperate with the main disc and to resist the fluid flowing through the communication passage;
    a ring disc having an outer periphery supported on a supporting portion of the housing and being provided in the rear of the pilot disc-S and in contact with the pilot disc-S; and
    a spacer disc inserted between the main disc and the pilot disc-S, the spacer disc having a smaller outer diameter smaller than that of an arc-shaped slot of the ring disc in order to allow the pilot disc-S to be bent forward when the pressure in the pilot chamber is increased,
    wherein an outer end of the pilot disc-S is separated from the main disc.

2. The shock absorber as claimed in claim 1 wherein the pilot disc-S has a slit formed on an outer periphery thereof and the arc-shaped slot is formed in the ring disc between its inner and outer peripheries so that the arc-shaped slot communicates with the slit of the pilot disc-S.

3. The shock absorber as claimed in claim 1 wherein the spacer disc has an arc-shaped slot formed by removing an intermediate portion in a radial direction thereof.

4. The shock absorber as claimed in claim 1 wherein the disc valve further includes a pilot disc inserted between the pilot disc-S and the spacer disc.

* * * * *